(12) United States Patent
Lemmen et al.

(10) Patent No.: US 11,337,383 B2
(45) Date of Patent: May 24, 2022

(54) DEVICE FOR GROWING MUSHROOMS

(71) Applicants: Jacobus Alexander Jozef Lemmen, Venlo (NL); Marcus Gerardus Maria Van Doremaele, Velddriel (NL)

(72) Inventors: Jacobus Alexander Jozef Lemmen, Venlo (NL); Marcus Gerardus Maria Van Doremaele, Velddriel (NL)

(*) Notice: Subject to any disclaimer, the term of this patent is extended or adjusted under 35 U.S.C. 154(b) by 208 days.

(21) Appl. No.: 16/430,157

(22) Filed: Jun. 3, 2019

(65) Prior Publication Data
US 2019/0364749 A1 Dec. 5, 2019

(30) Foreign Application Priority Data

Jun. 4, 2018 (NL) .................................... 2021053
Mar. 8, 2019 (NL) .................................... 2022703

(51) Int. Cl.
*A01G 18/62* (2018.01)
*A01G 18/69* (2018.01)
*A01G 18/20* (2018.01)

(52) U.S. Cl.
CPC ............. *A01G 18/62* (2018.02); *A01G 18/20* (2018.02); *A01G 18/69* (2018.02)

(58) Field of Classification Search
CPC ........ A01G 18/62; A01G 18/69; A01G 18/20; A01G 18/00
USPC ........................................................... 47/1.1
See application file for complete search history.

(56) References Cited

U.S. PATENT DOCUMENTS

2016/0135384 A1   5/2016  Souder et al.
2020/0100437 A1*  4/2020  Christiaens ............ A01G 18/62

FOREIGN PATENT DOCUMENTS

| CN | 103238477 A    | 8/2013  |
| CN | 203985152 U    | 12/2014 |
| CN | 105917957 A    | 9/2016  |
| CN | 206978252 U    | 2/2018  |
| CN | 207040403 U    | 2/2018  |
| CN | 207040404 U    | 2/2018  |
| CN | 207252401 U    | 4/2018  |
| CN | 207531524 U    | 6/2018  |
| EP | 3 387 896 A2   | 10/2018 |

(Continued)

OTHER PUBLICATIONS

Search Report and Written Opinion for Netherlands Patent Application No. 2021053 with a completion date of Feb. 28, 2019.

(Continued)

*Primary Examiner* — Monica L Barlow
*Assistant Examiner* — Aaron M Rodziwicz
(74) *Attorney, Agent, or Firm* — Katten Muchin Rosenman LLP

(57) ABSTRACT

The present invention relates to a device for growing mushrooms, comprising a shelving, arranged for supporting beds for holding compost, said beds for holding compost wherein the beds are placed at a mutual distance above each other characterized in that the beds are movable between at least a first position, wherein a second bed supported above a first bed at least partially impedes the accessibility of the first bed in a direction perpendicular to the plane in which the first bed extends and a second position in which at least a larger part of the first bed is free approachable from a direction perpendicular to the plane in which the first bed extends than in the first position.

16 Claims, 3 Drawing Sheets

(56) References Cited

FOREIGN PATENT DOCUMENTS

| EP | 3387896 A2 | * | 10/2018 | ............. A01G 18/70 |
| FR | 1066500 A | * | 6/1954 | ............. A01G 18/62 |
| FR | 1116739 A | * | 5/1956 | ............. A01G 18/69 |
| WO | 2005/077152 A1 | | 8/2005 | |
| WO | WO-2017078535 A1 | * | 5/2017 | ............. A01G 18/62 |
| WO | WO-2017105067 A1 | * | 6/2017 | ............. A01G 18/62 |
| WO | WO-2019226046 A1 | * | 11/2019 | ............. A23K 50/75 |
| WO | WO-2020013756 A1 | * | 1/2020 | ............. A01G 18/62 |

OTHER PUBLICATIONS

Search Report and Written Opinion for Netherlands Patent Application No. 2022703 with a completion date of Mar. 8, 2019.
The extended European search report dated Oct. 2, 2019, from European Application No. 19178055.0, 7 sheets.
Canadian examination report dated Oct. 27, 2020, from Canadian Application No. 3,045,087, 8 sheets.
Patent examination report dated Feb. 16, 2021, from New Zealand Application No. 754225, 4 sheets.

* cited by examiner

DEVICE FOR GROWING MUSHROOMS

The present invention relates to a device for growing mushrooms. At industrial scales, mushrooms are traditionally grown at indoor locations, often called growing rooms, wherein shelvings are placed that support beds for holding compost and casing soil, on which the mushrooms are grown.

The compost and casing soil are placed on pulling nets, that allow to fill and empty the bed with compost and casing soil easily. Usually, this is done after every two or three flushes of mushrooms, since the compost has lost its fertility and nutrition then. Beds for growing mushrooms allow the pulling nets with the compost to be pulled from one end in the length direction to another end in the length direction. The ends are therefore openable, that is, access can be provided at the support level of the bed, for instance because an end wall is (re)movable. Preferably access can also be prohibited, in order to prevent compost falling out at the ends.

The beds are placed at a mutual distance above each other in the shelving, and harvest of the mushrooms takes place manually by harvesters, standing next to the beds at various height levels and delivering the mushrooms to harvesting conveyors once they are cut. From there on they are further processed, either manually or in an automated way.

The beds have an average length of 10 to 100 meters, a width of 0.5 to 2 meters, preferably between 0.6 and 1 meter and more preferably between 0.65 and 0.75 meter and are usually placed 0.4 to 1.4 meters above each other. As a result, the harvesters cannot reach all mushrooms without stooping. Given the required speed of working and the total length of the beds, this makes harvesting a cumbersome job, with even certain health risks. Moreover, harvesters tend to stand straight to avoid a painful back, but in this position they only have sight to a part of the bed, with the result that part of the harvesting takes place on intuition, which may have a negative impact on the quality of the work, since a better selection can be made when an eye is kept on the work.

It is a goal of the present invention to provide a device for growing mushrooms that takes away the disadvantages of the prior art. The invention thereto proposes a device for growing mushrooms, comprising a shelving supporting beds for holding compost, wherein the beds are placed at a mutual distance above each other, wherein the beds are movable between at least a first position, wherein a second bed supported above a first bed at least partially impedes the accessibility of the first bed in a direction perpendicular to the plane in which the first bed extends and a second position in which at least a larger part of the first bed is free approachable from a direction perpendicular to the plane in which the first bed extends than in the first position. Preferably this goes for the entire first bed at once, over its full length.

With impeding the accessibility of the first bed is meant that the bed cannot be reached because there is another bed in the way for the harvester. A direction perpendicular to the plane in which the first bed extends is—in case of a bed that extends in a horizontal plane which is the common orientation for a bed for growing mushrooms—the direction from straight above. If the bed is under an angle with the horizontal plane, this perpendicular direction changes of course.

Free approachable means that a harvester does not need to bend or that his or her sight is not impeded because of an overlaying bed. That means that there is at least a free zone of 40, preferably at least 50 centimeters and more preferably more than 60 centimeters in the perpendicular direction.

In the devices according to the state of the art, beds are arranged on top of each other. In such case, the harvester has to work in between beds that are on top of each other. The device according to the present invention takes away this disadvantage and makes the mushrooms available for harvesting and visible for inspection during harvest.

Configurations within the scope of the present invention are thinkable wherein movement of the beds requires both beds to change place or orientation, but preferably the displacement between the first and the second position requires a displacement of the first bed only. This keeps both the technical configuration and the use of the device as simple as possible.

In a preferred embodiment of the invention, the beds are equal and are positioned exactly above one another in vertical direction. This leads to an efficient use of space in the growing room or other location where the shelving is placed, and also makes the work for the harvesters easier, since they do not need to adapt their position or the tooling they work with when changing from bed to bed. Additionally, this standardization has benefits in production, and in the use of tooling like pulling nets, picking lorries and/or picking platforms.

In a preferred embodiment, the first bed is in the second position is completely freely accessible from a direction perpendicular to the plane in which it extends.

The displacement between the first and the second position may for instance comprise a translation of a bed. In such case, the bed is arranged in a drawer-like configuration to the shelving. That means that the translation takes place in the width direction of the bed. One benefit of such system is that the orientation of the bed remains the same, that is in most cases: essentially horizontal.

However, such drawer-like configuration has the disadvantage that it requires more space around the shelving. In a preferred embodiment therefore, the displacement between the first and the second position may comprise a rotation of a bed. This embodiment has the advantage that a relatively simple construction can be applied, but additionally, that there is no more space required than the devices according to the prior art require.

Preferably, the rotation of a bed takes place around an axis in the longitudinal direction of the bed which axis is situated at the underside of the bed, and is positioned in the middle in the width direction. This way, the bed is balanced and its rotation requires the least force that is in a practical embodiment obtainable. Moreover, the rotation around an axis at the bottom of the bed contributes to the accessibility of the bed in the second position, since the outmost point of the bed moves toward the harvester this way.

The bed may be rotatable to a maximum between 0 and 90 degrees, more preferably between 30 and 60 degrees and most preferably to a maximum angle of 45 degrees with respect to a horizontal position, in order to avoid the compost, soil ground and mushrooms to fall out of the bed when the bed is in its maximum rotated orientation. Furthermore it has appeared that an angle around 45 degrees is a convenient harvesting angle. An operating device, such as a spindle may be provided for easy and controlled movement of the bed from the first position to the second position.

In yet a further embodiment, there is a pair of beds at the same height supported by the shelving, which beds extend parallel to each other. The pair of beds may be rotatable on the same layer in the opposite direction. Such pair has the advantage that it may be dimensioned half as big as a bed according to the state of the art, in order to make the picking easier, or, dimensioned the same size, but then requiring less shelving equipment to support the same amount of bed surface. The beds may each have a width between 0.5 and 2 meters, and/or have a length between 10 and 100 meters.

In a preferred embodiment according to the invention, the shelving supports two sets of beds placed at a mutual distance above each other, wherein both sets extend in parallel to each other, and wherein there is at least one bed from the first set that in a vertical direction at least partially overlaps with a bed from the second set, wherein air flow with a vertical directional component is at least partially blocked between the bed from the first set and the in a vertical direction at least partially overlapping bed from the second set.

"At least partially overlapping" may in this application also be referred to as "essentially at the same height".

Preferably air flow with a vertical component is almost fully to fully blocked between the bed from the first set and the in a vertical direction at least partially overlapping bed from the second set.

By preventing air flow with a vertical component between adjacent beds this way, the climate for growing mushrooms is not disturbed by the fact that there are two sets or sets of beds parallel to each other. It is important that the highly conditioned circumstances under which mushrooms are grown, are kept as constant as possible. Changes in temperature, humidity and air flow may all have a negative impact on the growth, quality or uniformity of the mushrooms in the beds.

Preferably the two sets have the same amount of beds, and each bed of the first set has an adjacent bed in the second set.

More preferably air flow with a vertical directional component is blocked between each pair of beds.

The air flow may be blocked because the beds are arranged against each other in their first positions, but there may also be another barrier placed. This barrier may be alternatively be coupled to or mounted on the support, it may be coupled to one of two adjacent beds, to each of two adjacent beds or to both of two adjacent beds. The barrier may be a rigid part, it may be a bar or a plate, or may comprise one or more flexible parts, such as a flexible flap.

Preferably, air flow in a horizontal direction between two beds is allowed, so there is a common space above two adjacent beds, which may extend to a pair of beds arranged above the adjacent beds.

There may however be further essentially vertical barriers for preventing air on either side of the parallel sets. These barriers may comprise screens, for instance rollable screens, that prevent exchange of air and thus disturbance of the climate above the beds. Yet a further embodiment, the device may be provided with a height-adjustable conveyor belt, which extends in the longitudinal direction of the beds, and is movable in height to positions which correspond to a lower end of a bed situated in a second position.

The invention will now be elucidated into more detail with reference to the following figures, wherein.

Figure 1:
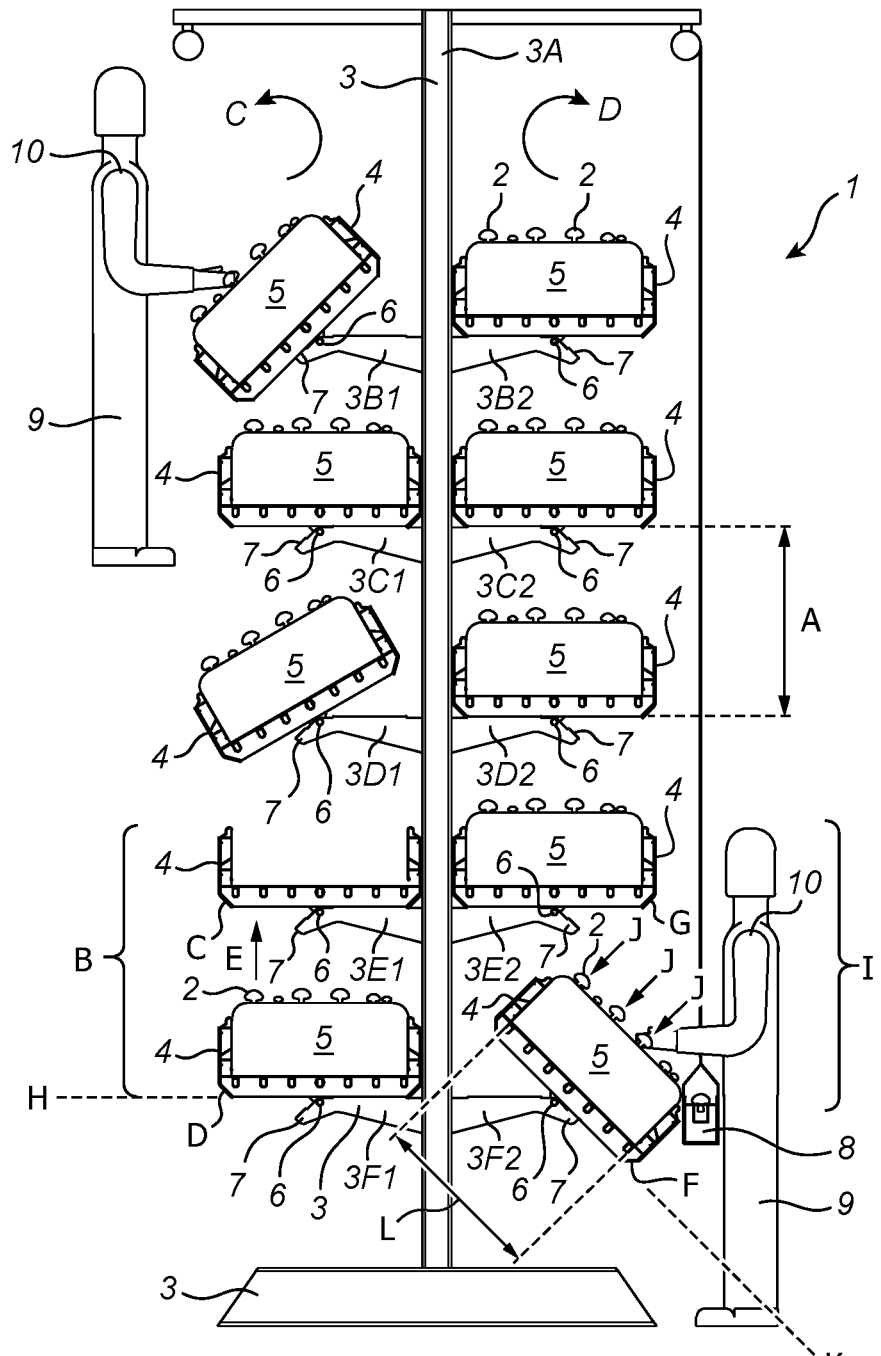
FIG. 1 is a schematic side-view of a device according to the present invention.

FIG. 1 shows a device 1 for growing mushrooms 2, comprising a shelving 3, supporting beds 4 for holding compost 5. The beds 4 are placed at a mutual distance A above each other, and movable between a first position B, wherein a second bed C supported above a first bed D at least partially impedes the accessibility of the first bed D in a direction E perpendicular to the plane H in which the first bed D extends; and a second position I in which at least a larger part of a first bed F is free approachable from a direction J perpendicular to the plane K in which the first bed F extends than in the first position.

The displacement between the first and the second position requires a displacement of the first bed F only. The first bed F is in the second position (shown) completely freely accessible from a direction perpendicular to the plane K in which it extends. The displacement between the first and the second position comprises a rotation of the bed F, around an axis 6 in the longitudinal direction of the bed which axis 6 is situated at the underside of the bed F, and is positioned in the middle in the width direction L.

The bed F is shown at its maximum angle of 45 degrees with respect to a horizontal position. The angular rotation is limited by a stop 7. As visible, there is a pair of beds 4 at the same height supported by the shelving 3, which beds extend parallel to each other. The device is further provided with a height-adjustable conveyor belt 8, which extends in the longitudinal direction of the beds, and is movable in height to positions which correspond to a lower end of a bed situated in a second position.

Visible is that the distance from the shoulder 10 of a harvester 9 to the compost and casing soil with the mushrooms is essentially the same for both sides of the bed in the second position. This is obtainable for all embodiments of the present invention.

The shelving 3 comprises a central upright 3A, and multiple beams 3B1, 3C1, 3D1, 3F1, 3G1, 13B, 3C, 3D, 3F, 3G. Beams 3B1 and 3B2 are at the same level, beams 3C1 and 3C2 are at the same level, beams 3D1 and 3D2 are at the same level, beams 3E1 and 3E2 are at the same level, and beams 3F1 and 3F2 are at the same level, and so are the respective beds supported by said beams.

Beds at the same level are rotatable from a horizontal position to a position wherein their compost (and casing soil and mushrooms) face away from each other, so that harvesting can take place from both sides next to the shelving, even simultaneously. In other words, the side of the bed that faces a bed at the same level goes upward when the bed is rotated and the side of the bed that faces to the outside of the shelving goes down when the bed is rotated. The directions of rotation are indicated with arrows C and D. All beds at the left side of the drawing of the device rotate in a counter-clockwise direction, and all beds at the right side of the drawing of the device rotate in a clockwise direction, when rotated from their first position to their second position.

As a result, harvesting can take place from the outside of the shelving, and both beds at the same level can be harvested simultaneously.

Figure 2:
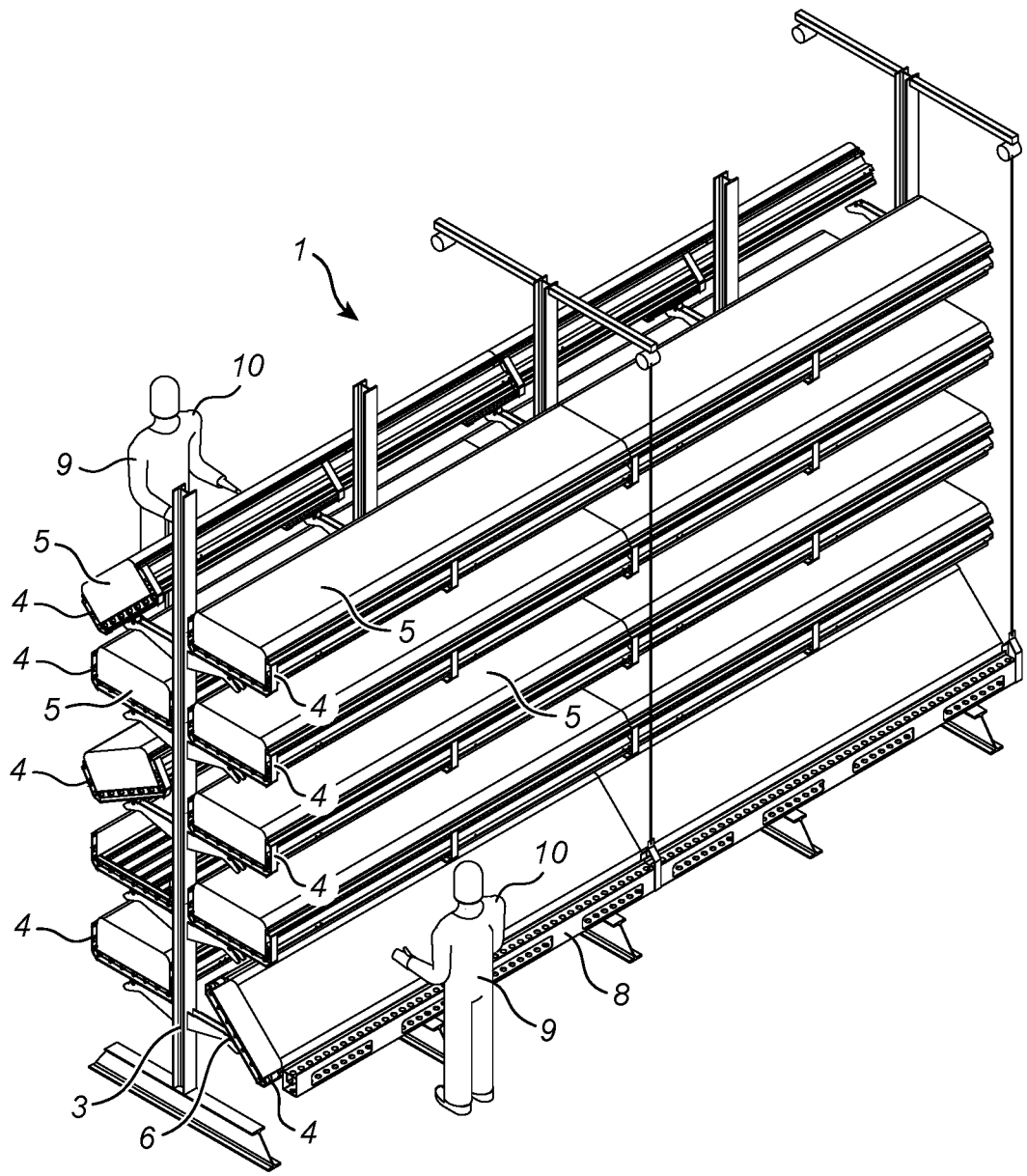
FIG. 2 is a perspective view of a device according to the present invention.

FIG. 2 shows the device from FIG. 1 in a perspective view.

Figure 3:
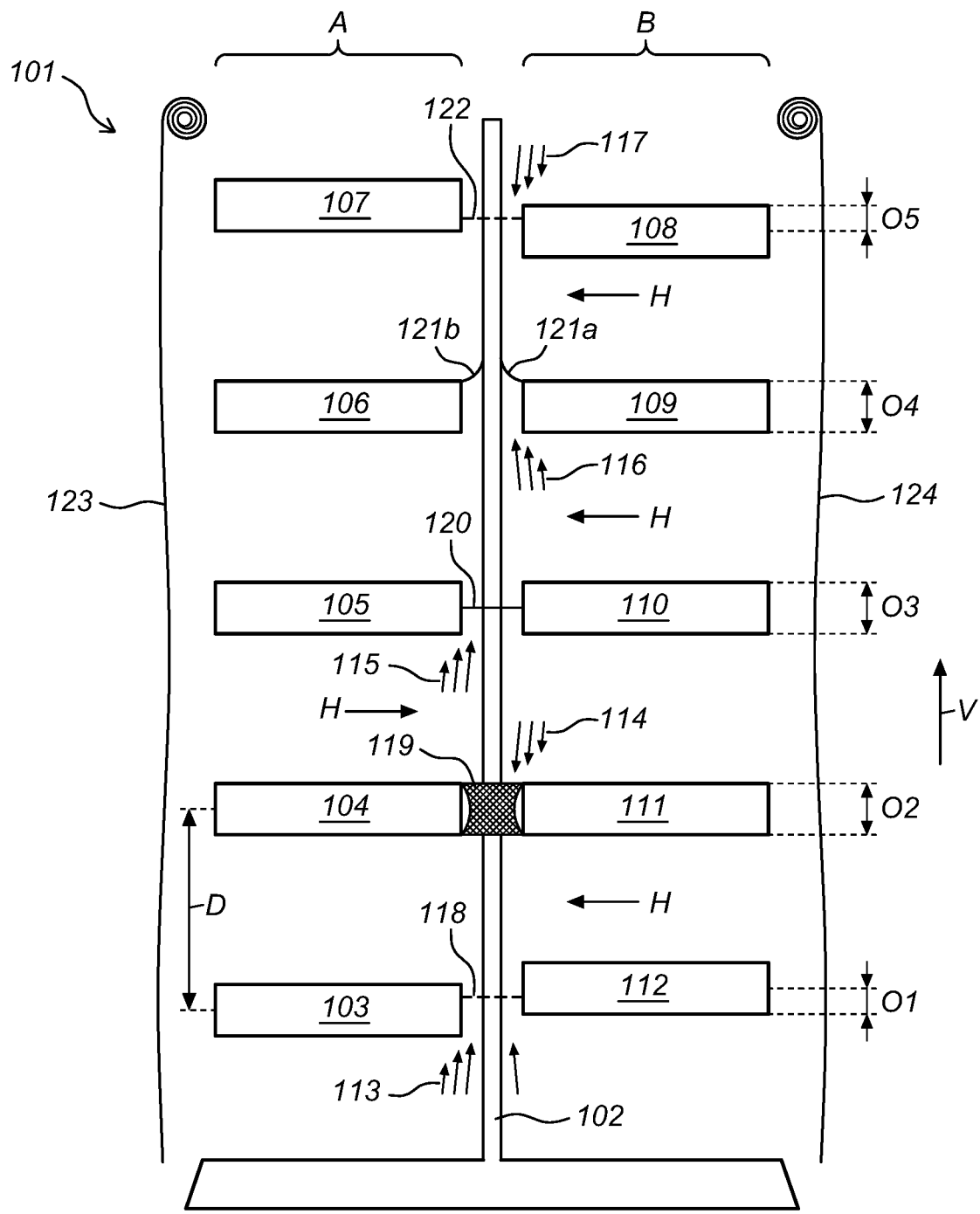
FIG. 3 is a schematic side-view of a device according to the present invention.

FIG. 3 shows a schematic side view of a device 101 for growing mushrooms, for instance, but not limited to a device from FIG. 1 or 2. The device 101 comprises a shelving 102 supporting beds 103-112 for holding compost, wherein the beds 103-112 are placed at a mutual distance D above each other, wherein the beds are movable between at least a first position (shown), wherein a second bed supported above a first bed at least partially impedes the accessibility of the first bed in a direction perpendicular to the plane in which the first bed extends and a second position (not shown) in which at least a larger part of the first bed is free approachable from a direction perpendicular to the plane in which the first bed extends than in the first position.

In the embodiment shown, the shelving supports two sets A, B of beds 103-107, 108-112 placed at a mutual distance D above each other, wherein both sets extend in parallel to each other, and wherein there is at least one bed 103-107 from the first set that in a vertical direction V at least partially overlaps O1, O2, O3, O4, O5 with a bed 108-112 from the second set, wherein air flow 113, 114, 115, 116, 117 with a vertical directional component V is at least partially blocked between the bed from the first set A and the in a vertical direction at least partially overlapping bed from the second set B.

There is a barrier 118-122 placed between adjacent beds. This barrier may be alternatively be coupled to or mounted on the support (118, 119, 120, 122), it may be coupled to one of two adjacent beds, to each of two adjacent beds or to both of two adjacent beds (121a, 121b). The barrier may be a rigid part (118, 119, 120, 122), it may be a bar (119) or a plate (118, 120, 122), or may comprise one or more flexible parts, such as flexible flaps (121a, 121b).

Air flow in a horizontal direction H between two beds (on top of each other) is allowed, so there is a common space above two adjacent beds, which may extend to a pair of beds arranged above the adjacent beds.

There are further essentially vertical barriers 123, 124 for preventing air on either side of the parallel sets. These barriers comprise rollable screens 123, 124, that prevent exchange of air and thus disturbance of the climate above the beds. The figures are for illustrative purposes only and do in no sense limit the scope of protection as defined by the following claims.

The invention claimed is:

1. A device for growing mushrooms, comprising:
 a shelving, arranged for supporting beds for holding casing soil and compost on a pulling net, wherein the shelving includes a central upright support with horizontal support beams extending therefrom;
 said beds for holding casing soil and compost on a pulling net;
 wherein:
  the beds are coupled to and supported by the horizontal support beams;
  the beds are placed at a mutual distance above each other;
  the beds are mutually movable, wherein a displacement between a first position and a second position requires a displacement of the first bed only, between at least:
   the first position, wherein a second bed supported above a first bed at least partially impedes the accessibility of the first bed in a direction perpendicular to a plane in which the first bed extends; and
   the second position in which at least a larger part of the first bed is free approachable from a direction perpendicular to the plane in which the first bed extends than in the first position;
  there is at least one pair of beds essentially at the same height supported by the shelving, which beds extend parallel to each other, wherein the at least one pair of beds are rotatable in the opposite direction; and
  the central upright support extends between the two beds in the at least one pair of beds.

2. The device according to claim 1 wherein a side of each of the at least one pair of beds that faces the other bed in the at least one pair of beds goes upward when the bed is rotated and an opposite side of each of the beds that faces away from the other bed in the at least one pair of beds goes downward when the bed is rotated.

3. The device according to claim 2, wherein the rotation of a bed takes place around an axis in the longitudinal direction of the bed which axis is situated at the underside of the bed, and is positioned in the middle in the width direction.

4. The device according to claim 1, wherein the beds have a width between 0.5 and 2 meters, in particular between 0.6 and 1 meter and more in particular between 0.65 and 0.75 meter.

5. The device according to claim 1, wherein the beds are rotatably coupled to the horizontal support beams.

6. The device according to claim 1, wherein, seen from the center of the device, a bed extends further in a width direction from the rotatable coupling than a beam that supports the bed.

7. The device according to claim 1, wherein the shelving supports two sets of beds, the beds of each set placed at a mutual distance above each other, wherein both sets extend in parallel to each other, and wherein there is at least one bed from the first set that in a vertical direction at least partially overlaps with a bed from the second set, wherein movement of air with a vertical directional component is at least partially blocked between the bed from the first set and the bed in a vertical direction at least partially overlapping bed from the second set when the bed from the first set and the bed from the second set are both in the first position.

8. The device according to claim 7, wherein air flow with a vertical component is almost fully to fully blocked between the bed from the first set and the bed in a vertical direction at least partially overlapping bed from the second set.

9. The device according to claim 7, wherein the two sets have the same amount of beds, and each bed of the first set has an adjacent bed in the second set.

10. The device according to claim 9, wherein air flow with a vertical directional component is blocked between each pair of beds.

11. The device according to claim 7, wherein the air flow is blocked because the beds are arranged against each other in their first positions.

12. The device according to claim 1, comprising a barrier for blocking air flow in a vertical direction, coupled to or mounted on the horizontal beams, to one of two adjacent beds, to each of two adjacent beds or to both of two adjacent beds.

13. The device according to claim 12, wherein the barrier is a rigid part.

14. The device according to claim 13 wherein the barrier includes one or more flexible parts.

15. The device according to claim 1, comprising a vertical barrier for preventing air on one or both sides of the parallel sets.

16. The device according to claim 1, comprising a spindle for moving the beds between the first and the second position, wherein the spindle is provided with an external coupling for a device for powering the spindle.

* * * * *